United States Patent [19]
Garito et al.

[11] Patent Number: 5,911,025
[45] Date of Patent: Jun. 8, 1999

[54] METHOD FOR THE PREPARATION OF OPTICAL FIBERS

[75] Inventors: A. F. Garito, Radnor; Rui-Fang Shi, King of Prussia; Chris Koeppen, Philadelphia, all of Pa.; Weidong Chen, Sunnyvale, Calif.

[73] Assignee: The Trustees of the University of Pennsylvania, Philadelphia, Pa.

[21] Appl. No.: 09/023,269

[22] Filed: Feb. 13, 1998

Related U.S. Application Data

[62] Division of application No. 08/696,369, Aug. 13, 1996, Pat. No. 5,729,645.

[51] Int. Cl.[6] .................................................. G02B 6/02
[52] U.S. Cl. ......................... 385/127; 385/124; 385/123; 65/385; 65/435
[58] Field of Search .................................. 385/122–128, 385/147; 359/341, 343; 65/385, 435; 427/163.1, 163.2

[56] References Cited

U.S. PATENT DOCUMENTS

| | | | |
|---|---|---|---|
| 3,711,262 | 1/1973 | Keck et al. | 65/3 |
| 3,823,997 | 7/1974 | Gloge et al. | 350/96 |

(List continued on next page.)

FOREIGN PATENT DOCUMENTS

| | | |
|---|---|---|
| 0 112 564 A1 | 7/1984 | European Pat. Off. . |
| 0 131 058 A1 | 1/1985 | European Pat. Off. . |
| 0 153 414 A1 | 9/1985 | European Pat. Off. . |
| 0 183 853 A1 | 6/1986 | European Pat. Off. . |
| 0 203 327 A2 | 12/1986 | European Pat. Off. . |
| 0 208 159 A2 | 1/1987 | European Pat. Off. . |
| 0 242 636 A2 | 10/1987 | European Pat. Off. . |
| 0 316 507 A2 | 5/1989 | European Pat. Off. . |
| 0 451 266 A1 | 10/1991 | European Pat. Off. . |
| 1-189602 | 7/1989 | Japan . |
| 2-16505 | 1/1990 | Japan . |
| 2-33104 | 2/1990 | Japan . |
| WO 91/05275 | 4/1991 | WIPO . |

OTHER PUBLICATIONS

Allik, T.H. et al., "Dye Lasers Go Solid–State", *Lasers & Optronics*, 1995, 13–15.
Bowden and Turner (Eds.), *Polymers for High Technology*, ACS Symposium Series 346, American Chemical Society, Washington, DC, 1987.
Chan, K.B. et al., "Propagation Characteristics of an Optical Waveguide with a Diffused Core Boundary", Elect. Lett., 1970, (6) 23, 748–749.
Emslie, "Review Polymer Optical Fibers", J. of Mat. Science, 1988, 23, 2281–2293.
*Glass Materials, Fiber Fabrication, and Characterization Techniques*, Chap. 7, 128–137.
Gloge et al., "Multimode Theory of Graded–Core Fibers", *Bell Systems Technical J.*, 1973, 52 (9) 1563–1578.
Guttendorf, R., Laser Beams as Networking Vehicles, *Lasers & Optronics*, 1995, 19–20.
Ho, B.C. et al., "Gradient–Index Polymer Fibers Prepared by Extrusion", Polymer J., 1995, 27 (3), 310–313.
Kaino, T., "Polymer Optical Fibers", *Polymers for Lighthouse and Integrated Optics Technology and Applications*, Lawrence A. Hornak (ed.), Marcel Dekker, Inc., New York, 1992, 1, 1–38.
Koike, Y., "Graded Index Materials and Components", *Polymers for Lighthouse and Integrated Optics Technology and Applications*, Lawrence A. Hornak (ed.), Marcel Dekker, Inc., New York, 1992, 3, 71–104.
Konishi, S. et al., "r–Grin Glass Rods Prepared by a Sol–Gel Method", J. Non–Cryst. Solids, 1988, 100, 511–513.

(List continued on next page.)

*Primary Examiner*—Phan T. H. Palmer
*Attorney, Agent, or Firm*—Woodcock Washburn Kurtz Mackiewicz & Norris LLP

[57] ABSTRACT

Optical fibers having novel refractive index profiles are disclosed. Optical fibers in accordance with the invention are especially useful for application in telecommunication applications such as networks. Processes for the preparation of optical fibers are also disclosed.

3 Claims, 10 Drawing Sheets

U.S. PATENT DOCUMENTS

| | | | |
|---|---|---|---|
| 4,006,962 | 2/1977 | Olshansky | 350/96 |
| 4,053,204 | 10/1977 | Miller | 350/96 |
| 4,057,320 | 11/1977 | Marcatili | 350/96 |
| 4,062,665 | 12/1977 | Izawa et al. | 65/3 A |
| 4,204,745 | 5/1980 | Sakai et al. | 350/96.31 |
| 4,234,910 | 11/1980 | Price | 362/105 |
| 4,260,221 | 4/1981 | Marcuse | 350/96.31 |
| 4,281,893 | 8/1981 | Yamada et al. | 350/96.31 |
| 4,329,190 | 5/1982 | Berg et al. | 156/60 |
| 4,381,269 | 4/1983 | Kaino et al. | 264/1.5 |
| 4,560,247 | 12/1985 | Aldebert | 350/96.3 |
| 4,593,974 | 6/1986 | Yamamoto et al. | 350/96.34 |
| 4,720,529 | 1/1988 | Kimura et al. | 525/454 |
| 4,724,316 | 2/1988 | Morton | 250/227 |
| 4,762,392 | 8/1988 | Yamamoto et al. | 350/96.3 |
| 4,798,445 | 1/1989 | Yamamoto et al. | 350/96.34 |
| 4,799,761 | 1/1989 | Yamamoto et al. | 350/96.31 |
| 4,822,122 | 4/1989 | Yamamoto et al. | 350/96.31 |
| 4,838,634 | 6/1989 | Bennion et al. | 350/96.12 |
| 4,848,869 | 7/1989 | Urruti | 350/96.33 |
| 4,852,982 | 8/1989 | Yamamoto et al. | 350/413 |
| 4,887,884 | 12/1989 | Hayden | 350/96.29 |
| 4,955,689 | 9/1990 | Fuller et al. | 350/96.34 |
| 4,979,798 | 12/1990 | Lagakos et al. | 350/96.33 |
| 4,981,777 | 1/1991 | Kuroiwa et al. | 430/270 |
| 4,992,524 | 2/1991 | Coady et al. | 528/49 |
| 5,058,983 | 10/1991 | Corke et al. | 385/78 |
| 5,062,685 | 11/1991 | Cain et al. | 350/96.23 |
| 5,114,546 | 5/1992 | Dapperheld et al. | 204/72 |
| 5,114,864 | 5/1992 | Walt | 436/528 |
| 5,115,811 | 5/1992 | Hartlaub et al. | 128/634 |
| 5,148,509 | 9/1992 | Kannabiran | 385/109 |
| 5,148,511 | 9/1992 | Savu et al. | 385/145 |
| 5,186,865 | 2/1993 | Wu et al. | 252/582 |
| 5,186,870 | 2/1993 | Fuller et al. | 264/1.2 |
| 5,191,206 | 3/1993 | Boiarski et al. | 250/227.14 |
| 5,199,098 | 3/1993 | Nolan et al. | 385/128 |
| 5,201,020 | 4/1993 | Kannabiran | 385/113 |
| 5,219,710 | 6/1993 | Horn et al. | 430/270 |
| 5,235,660 | 8/1993 | Perry et al. | 385/124 |
| 5,238,974 | 8/1993 | Yamamoto et al. | 522/75 |
| 5,239,026 | 8/1993 | Babirad et al. | 526/245 |
| 5,246,782 | 9/1993 | Kennedy et al. | 428/421 |
| 5,252,494 | 10/1993 | Walt | 436/528 |
| 5,265,178 | 11/1993 | Braun et al. | 385/24 |
| 5,290,730 | 3/1994 | McFarlane et al. | 437/129 |
| 5,356,561 | 10/1994 | Shimizu et al. | 252/299.62 |
| 5,379,311 | 1/1995 | McFarlane et al. | 372/41 |
| 5,390,274 | 2/1995 | Toyoda et al. | 385/124 |
| 5,729,645 | 3/1998 | Garito et al. | 385/127 |

OTHER PUBLICATIONS

Miller, S.E. and Kaminow, I.P. (eds.), *Optical Fiber Telecommunications*, Academic Press, New York, NY, 1979.

Miller, S.E. and Kaminow, I.P. (eds.), *Optical Fiber Telecommunications*, Academic Press, New York, NY, 1988.

Plastic Optical Fibers and Application, Information Gatekeepers, Boston, MA, vol. 25, 1994.

"SpecTran Specialty Optics Company: Specialty optical fibers are our specialty", *Laser & Optronics*, 1995, 96.

Teyssier, C. et al., "What's Next for Plastic Optics?", *Lasers & Optronics*, 1995, 23–24.

Thomas, M., "Testing Optical Coatings, *Lasers & Optronics*", 1995, 33–34.

Theis, J. et al., "Polymer Optical Fibers in Data Communications and Sensor Applications", *Polymers for Lighthouse and Integrated Optics Technology and Applications*, Lawrence A. Hornak (ed.), Marcel Dekker, Inc., New York, 1992, 2, 39–69.

METHOD FOR THE PREPARATION OF OPTICAL FIBERS

This application is a division of application Ser. No. 08/696,369 filed Aug. 13, 1996 now U.S. Pat. No. 5,729,645.

FIELD OF THE INVENTION

This invention relates to optical waveguides for transmitting optical signals, especially optical fibers, having novel refractive index profiles. In preferred embodiments, the invention provides optical fibers having both high bandwidth and high numerical aperture.

BACKGROUND OF THE INVENTION

Optical fiber is the major transmission medium in high capacity long distance communication systems. However, in short range data communication applications, such as local area networks, and in integrated applications, such as within the elements of a computer, automobile, watercraft, aircraft, satellite, machine or other similar systems, optical fiber has found only limited use. Such applications have been limited for several reasons. Among these are the higher costs of fiber systems relative to copper wire systems, and the difficulty and high cost of making fiber connections. A typical glass optical fiber has a relatively small core diameter, and a numerical aperture which makes connection or splicing of such fiber labor-intensive, time consuming, and expensive. Interest has centered on large core diameter optical fiber for local area network applications because of its ease of connection and splicing. However, typical large diameter fibers commercially available, are usually of the step indexed type, which have a bandwidth comparable to copper wire media. This bandwidth is generally too low for high data rate applications.

A step index optical fiber is characterized by a core having a uniform refractive index, surrounded by a cladding layer having a lower refractive index. FIG. 1 shows the refractive index profile for such a fiber. In a step index fiber, light is confined by total internal reflection between the core-cladding boundary. The confinement is best described by guiding modes, which can be visualized as light traveling at different angles with respect to the longitudinal axial direction. Modes traveling at larger angles travel further distances, and, hence, arrive at the fiber output end at different times. This phenomenon, termed intermodal time dispersion, or simply modal dispersion, limits the amount of optical signals that can be transmitted over the fiber; i.e., the bandwidth. For a typical large core step-index glass optical fiber, the bandwidth is limited to approximately 10 MHZ·km.

A possible solution to the modal dispersion problem is graded index optical fiber. It has been found that by continuously varying the refractive index from a maximum at the center of the optical fiber to a lower value at the core-cladding boundary, dispersion can be greatly reduced. Gloge and Marcatili, "Multimode Theory of Graded-Core Fibers," *Bell System Technical Journal*, November 1973, pp. 1563–1578, have proposed a graded index profile n(r) for a waveguide of radius r, given by:

$$n(r) = n_f \sqrt{1 - 2\Delta\left(\frac{r}{a}\right)^{2-2\Delta}}$$

wherein:
$n_f$ is the refractive index at the center of the core; $n_c$ is the refractive index of the cladding layer; $\Delta=(n_f-n_c)/n_f$; and a is the core radius.

FIG. 2 shows such a graded index profile that varies continuously from the highest index value at the core center to a lower value at the core-cladding boundary. The waveguide bandwidth is increased because those modes traveling greater distances extend to greater radius and therefore travel faster due to the smaller average refractive index at greater radius. Such profiles can potentially reduce the delay time dispersion, and correspondingly, increase the bandwidth. For example, a graded index fiber having comparable core and cladding refractive indices as the step index fiber described above has a bandwidth of approximately 1–10 GHz·Km. However, graded index fibers have generally small numerical apertures, are difficult to fabricate, and are costly to manufacture.

Accordingly, there exists a need for optical waveguides, especially optical fibers, that combine both relatively high bandwidth and relatively high numerical aperture, and that can be fabricated using existing technology. This invention is directed to this important end.

OBJECTS OF THE INVENTION

It is one object of the present invention to provide novel optical fibers having both high bandwidth and high numerical aperture.

It is another object of the present invention to provide novel optical fibers having improved refractive index profiles.

It is another object of the present invention to provide novel optical fibers that can be fabricated using existing technology.

It is another object of the present invention to provide processes by which the novel optical fibers possessing the properties described above can be manufactured and employed for signal transmission and other uses.

SUMMARY OF THE INVENTION

These and other objects are satisfied by the present invention, which provides novel optical waveguides, especially optical fibers, having novel refractive index profiles, and further provides processes for the manufacture, and use of the waveguides.

In preferred embodiments, the optical waveguides of the invention comprise:
an inner core;
an outer core on the inner core; and a cladding layer on the outer core;
wherein:
the inner core has a refractive index which is greater than the refractive index of the outer core;
the outer core has a refractive index that decreases smoothly, monotonically and nonlinearly with increasing radius from the boundary of the inner core and the outer core to the boundary of the outer core and the cladding layer;
there is a step in the refractive index at the boundary of the inner and outer cores; and the cladding layer has a refractive index which is equal to or greater than the lowest refractive index of the outer core.

In certain preferred embodiments, there is a step in refractive index at the boundary of the outer core and the cladding layer. In further preferred embodiments, the refractive index of the cladding layer is intermediate between the highest and lowest refractive indices of the inner core. In other preferred embodiments, the refractive index profile is substantially in accordance with FIG. 3.

In some preferred embodiments, the refractive index of the inner core decreases from the center of the fiber to the boundary between the inner core and the outer core, and, in other preferred embodiments, the refractive index of the inner core is substantially uniform throughout the inner core.

In other preferred embodiments, the refractive index of the inner core is graded, varying approximately parabolically with increasing fiber radius.

In preferred embodiments wherein the inner core has a substantially uniform refractive index, the refractive index profile of the graded inner core is such that if the graded index profile is extrapolated into the inner core region, then the value for the refractive index at the center of the inner core region, obtained from the extrapolated curve, would be greater than the refractive index of the inner core region of the optical fiber.

In another embodiment, the refractive index of the outer core is substantially in accordance with the equation:

$$n(r) = \frac{\frac{n_f^2}{n_0}}{1 + \left(\frac{n_f^2}{n_0^2} - 1\right)\left(\frac{r}{a_0}\right)^2}$$

wherein:

$n(r)$ is the refractive index at radius r;

$a_0$ is the radius of the inner core;

$n_f$ is the refractive index at the center of the inner core; and $n_0$ is determined by requiring that $n=n_c$ at $r=a$, where $n_c$ is the refractive index of the cladding layer and a is the combined radius of the inner and outer cores.

In another preferred embodiment, one or more of the inner core, the outer core, or the cladding layer comprises glass. In other preferred embodiments, one or more of the inner core, the outer core, or the cladding layer comprises at least one organic polymer. In some more preferred embodiments the outer core comprises at least two organic polymers having different refractive indices. In a particularly preferred embodiment, the inner core is glass, and the outer core includes at least one organic polymer.

In some preferred embodiments, the organic polymers are selected from polycarbonates, polyesters, polyolefins, polystyrenes, polysiloxanes, polyurethanes, particularly poly(methylmethacrylate), polystyrene, copolymers of methylmethacrylate and vinyl phenyl acetate (P(MMA-VPAc)), copolymers of methylmethacrylate and vinyl benzoate (P(MMA-VB)), methyl methacrylate styrene, acetonitrile butadiene styrene, and styrene acrylonitrile.

In preferred embodiments, the inner core is symmetrically disposed about the central axis of the fiber, and the outer core is symmetrically disposed about the inner core.

Preferably, the cladding layer comprises an organic polymer selected from a copolymer of vinylidene fluoride and tetrafluorethylene and hexafluoropropylene, fluoroalkyl methacrylate polymer, fluorinated polycarbonate, and fluorinated polysiloxane.

The graded index profile in glass cores of the fibers of the invention can be achieved by methods of fabrication that include, for example, chemical vapor deposition, vapor phase axial deposition, their modifications, or related ion diffusion processes.

The graded index profile in polymeric cores of the fibers of the invention can be achieved by photo copolymerization, multi-stage copolymerization, centrifugal molding, interfacial gel copolymerization, photo-locking, photo-bleaching, or polymerization initiator diffusion.

Also provided are optical waveguides having the novel index profiles of the invention and coating, extrusion, and drawing methods for the preparation of the graded step index fibers of the invention.

BRIEF DESCRIPTION OF THE DRAWINGS

The numerous objects and advantages of the present invention may be better understood by those skilled in the art by reference to the accompanying Figures, in which.

DETAILED DESCRIPTION OF PREFERRED EMBODIMENTS

Figure 1:
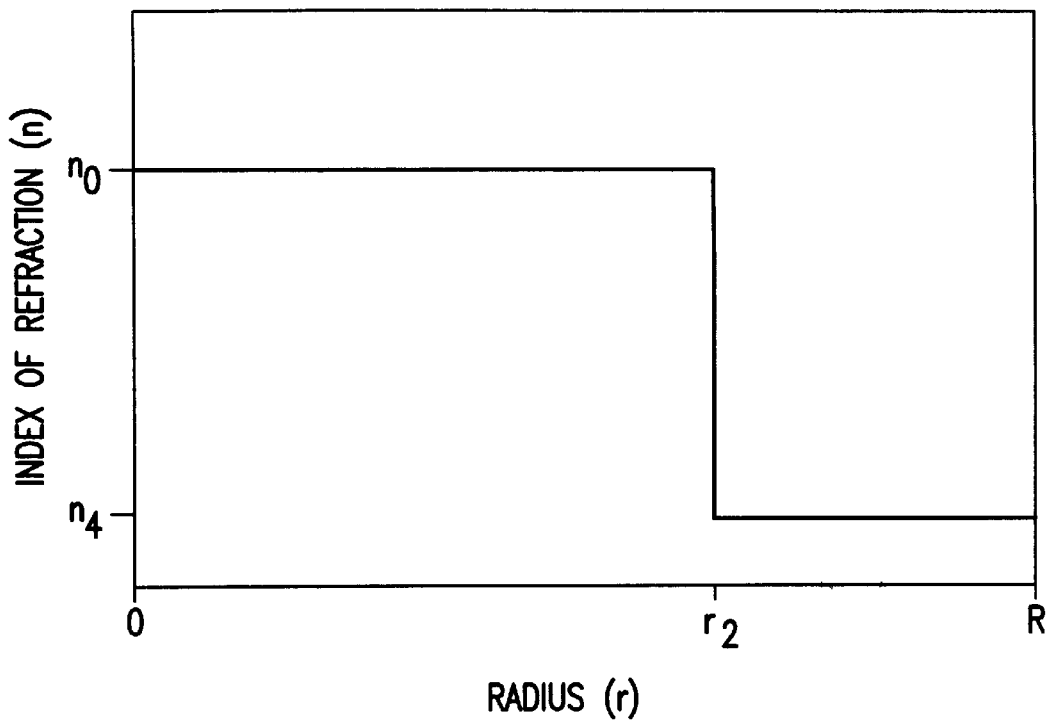
FIG. 1 shows a step index profile.
Figure 2:
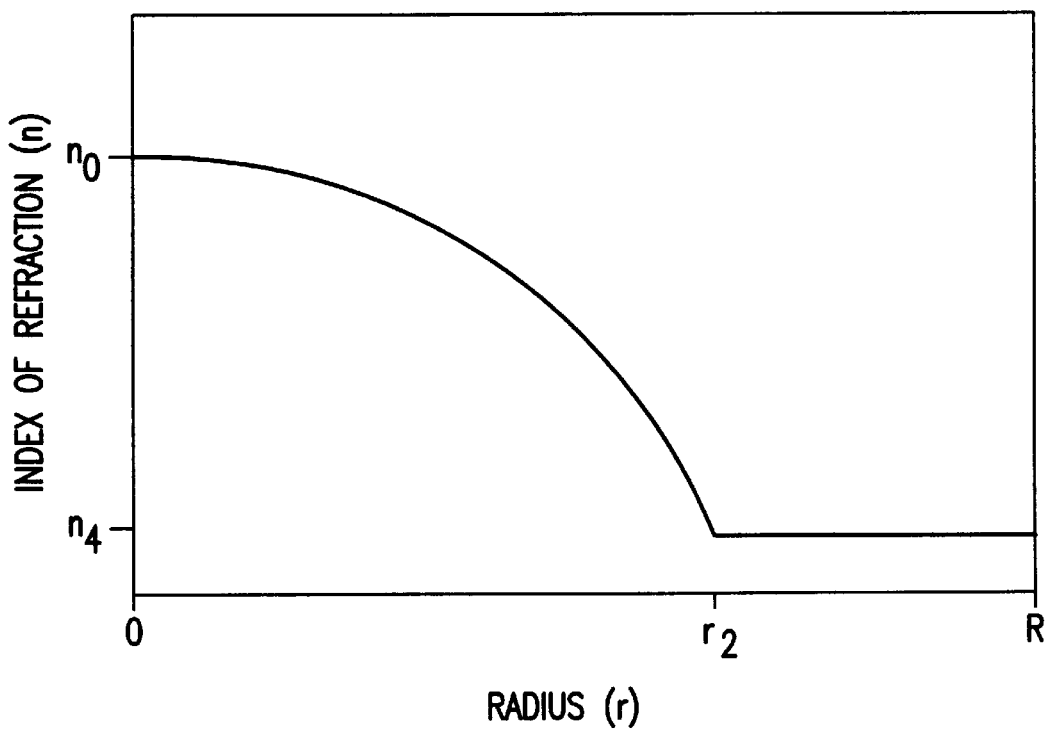
FIG. 2 shows a graded index profile.

This invention provides novel optical fibers having improved refractive index profiles. In one aspect of the invention, optical fibers are provided which comprise:

an inner core;

an outer core on the inner core; and a cladding layer on the outer core;

wherein:

the inner core has a refractive index which is greater than the refractive index of the outer core;

the outer core has a refractive index that decreases smoothly, monotonically and nonlinearly with increasing radius from the boundary of the inner core and the outer core to the boundary of the outer core and the cladding layer;

there is a step in the refractive index at the boundary of the inner and outer cores; and the cladding layer has a refractive index which is equal to or greater than the lowest refractive index of the outer core.

As used herein, the term "optical fiber" has its accustomed meaning of a fiber (e.g., a thin rod) containing one or more core regions within which light travels, and a cladding layer on the outermost core region. "Bandwidth" has its accustomed meaning of the amount of data that can be transmitted per unit time. "Numerical aperture" is the acceptance angle over which light rays entering a fiber will be guided. The term "refractive index profile" refers to the relationship of the refractive index as a function of fiber radius.

In addition to optical attenuation, two important properties of an optical fiber are its bandwidth and numerical aperture. Higher bandwidth leads to higher achievable transmission data rates, and larger numerical aperture leads to greater acceptance angles, and hence, to more efficient source-to-fiber coupling, lower loss fiber-to-fiber connections, and lower bending losses. The optical fibers of the present invention have superior bandwidth and numerical aperture compared to traditional step index and graded index optical fibers.

In preferred embodiments of the invention, the refractive index profile of the inner core either decreases from the center of the fiber to the boundary between the inner core and the outer core, or is substantially uniform throughout the inner core. However, the benefits afforded by the present invention are also obtainable with inner cores which have varying index profiles. It is only required that there is a step in refractive index at the boundary between the inner and outer cores.

The refractive index of the outer core of fibers of the invention decreases with increasing fiber radius smoothly, monotonically, and nonlinearly. In preferred embodiments, the refractive index profile of the graded outer core is a parabola. However, the particular shape of the index profile of the outer core is not critical, provided the preceding criteria are met.

As used herein, the term smooth has its normal meaning as a continuous (i.e., unbroken) curve. The term monotonic, as applied to the decrease in refractive index of outer cores, denotes a continuing decrease. The term nonlinear as used herein denotes a function other than a is straight line, and preferably which has a positive curvature.

Figure 3:
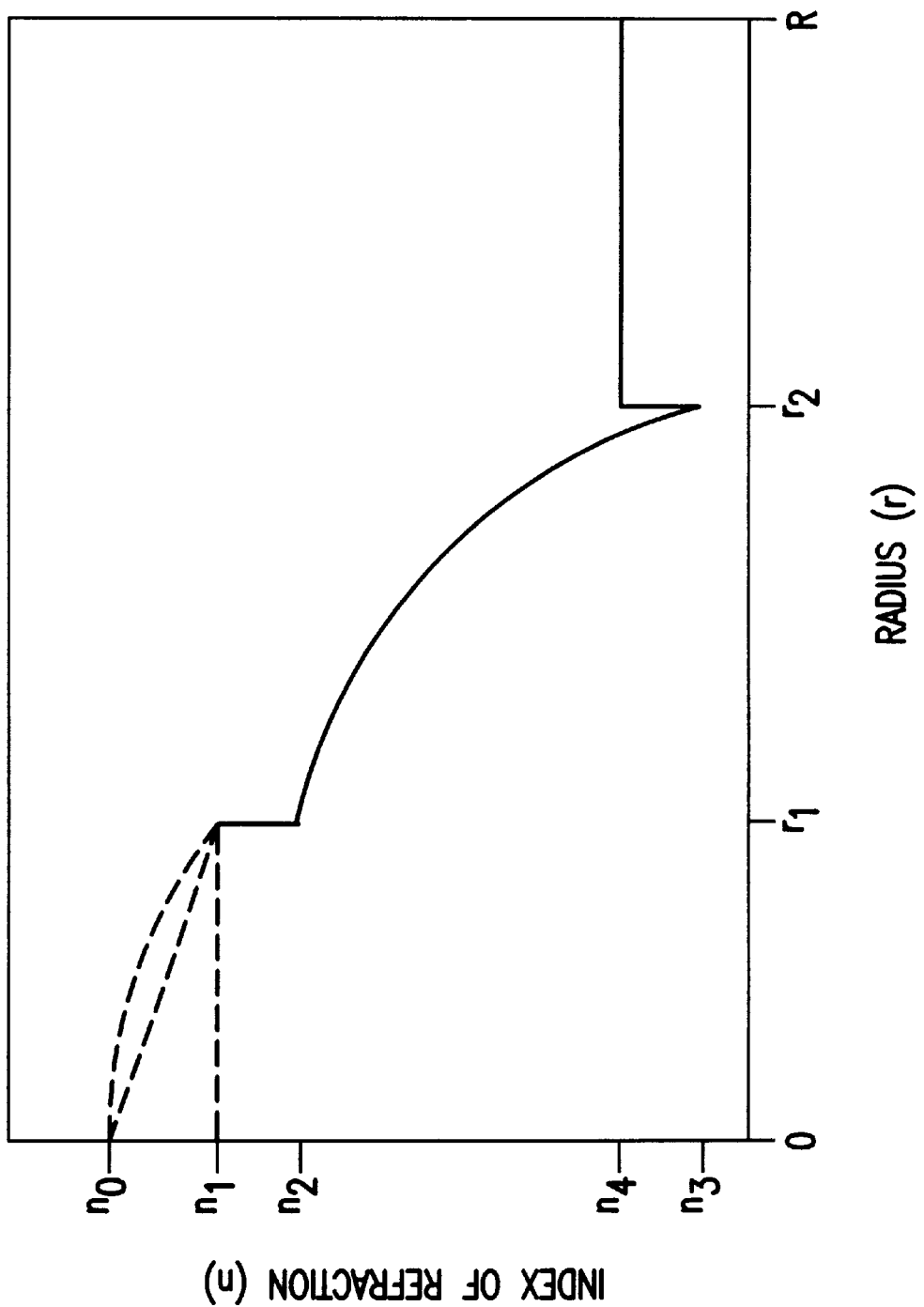
FIG. 3 shows an exemplary refractive index profile according to certain embodiments of the invention.

FIG. 3 shows the refractive index profile of a preferred embodiment of the optical fibers of the invention. The refractive index of the inner core smoothly decreases from a value of $n_0$ at the center (r=0) of the fiber to a value of $n_1$ at the inner core-outer core boundary ($r=r_1$). At the boundary of the inner core and outer core there is a sharp discontinuous decrease (i.e. "step") in refractive index from the high value, $n_1$, of the inner core to a lower value, $n_2$, of the smoothly graded outer core. The graded outer core is characterized by a convex, smoothly varying refractive index, monotonically decreasing from its highest value, $n_2$, to its lowest value, $n_3$, at the outer core—cladding boundary ($r=r_2$). At the boundary of the outer core and the cladding there is a sharp discontinuous increase, or step, in refractive index from the low value, $n_3$, of the graded outer core to a higher value, $n_4$, of the uniform cladding. The cladding preferably has a uniform refractive index, $n_4$, extending from the outer core—cladding boundary to the surface of the fiber (r=R).

The refractive index distribution of the inner core follows approximately one of the alpha ($\alpha$)-profiles $$n(r) \approx n_0\left(1 - 2\left(\frac{n_0 - n_1}{n_0}\right)\left(\frac{r}{r_1}\right)^\alpha\right)^{1/2} \text{ for } r < r_1 \quad (1)$$

for any positive alpha. In the limiting case where $n_0=n_1$, the inner core has a uniform refractive index. The refractive index distribution of the graded outer core only approximately follows a parabolic profile $$n(r) \approx n_2\left(1 - \left(\frac{n_2 - n_3}{n_2}\right)\left(\frac{r - r_1}{r_2 - r_1}\right)^2\right) \text{ for } r_1 < r < r_2. \quad (2)$$

In preferred embodiments of the fibers of the invention, the refractive index distribution of the cladding is uniform, $n(r)=n_4$. The size of the refractive index steps at ($r=r_1$) and ($r=r_2$) are determined by numerical calculation so as to maximize the bandwidth of the fiber. Suitable calculation methods include WKB, Rayleigh-Ritz, power series, finite element analysis, and others known in the art.

In preferred embodiments of the invention, the refractive index profile of the graded inner core is described by a function having a smooth, positive curvature, which decreases smoothly, monotonically and nonlinearly with increasing radius. In especially preferred embodiments of the invention wherein the inner core has a substantially uniform refractive index profile, the refractive index profile of the graded inner core is preferably such that if the graded index profile is mathematically extrapolated into the inner core region, then the value for the refractive index at the center of the inner core region, obtained from the extrapolated curve, will be a value greater than the refractive index of the inner core region of the fiber.

Guiding modes in an optical fiber must satisfy the following differential equation:

$$\frac{1}{r}\frac{d}{dr}\left(r\frac{d\phi}{dr}\right) + \left(n^2 k_0^2 - \beta^2 - \frac{v^2}{r^2}\right)\phi = 0 \quad (3)$$

where n=n(r) is the refractive index, $v$ is the azimuthal mode number, and $\beta$ is the propagation constant of the mode.

In general, this equation cannot be solved exactly without using approximations. One approximation method known in the art is the WKB method, the details of which may be found in Gloge and Marcatili, supra. The propagation constant $\beta$ is found by solving the following equation:

$$\mu\pi = \int_{a_1}^{a_2} \sqrt{n^2 k_0^2 - \beta^2 - \frac{v^2}{r^2}} \, dr \quad (4)$$

where $\mu$ is the radial mode number, and $a_1$, $a_2$ are the position where the integrand vanishes.

The group delay time $\tau_{mn}$, which is the inverse of the group velocity, is related to the propagation constant $\beta$ by:

$$\tau = \frac{1}{c} \frac{d\beta}{dk_0} \quad (5)$$

From equation 4, neglecting the effect of material dispersions, the group delay time can be derived to be:

$$\tau = \frac{k_0}{\beta c} \frac{\int_{a_1}^{a_2} n^2/u \, dr}{\int_{a_1}^{a_2} 1/u \, dr} \quad (6)$$

where $u = \sqrt{n^2 k_0^2 - \beta^2 - \frac{v^2}{r^2}}$

For optical fibers of interest, the number of the guiding modes is on the order of tens of thousands to millions. Although $\mu$ and $v$ are integer numbers and $\beta$ can only take discrete values which satisfy equation 4, they can be treated as continuous variables. With equation 4 and equation 6, the dispersions of the group delay time can be derived, and the bandwidth of a fiber can be determined.

Within the weakly guiding approximation, where the relative index difference between the core and cladding is small, as is the case with most optical fibers, modes with different azimuthal mode number can have the same propagation constants. Such modes are denoted LP modes. When neglecting these differences in the group delay time of modes having different azimuthal mode numbers, additional simplifications can be carried out for the above equations. By integrating equation 2 over azimuthal mode number $v$, we obtain $$m = \int_0^{a_2} (n^2 k_0^2 - \beta^2) r \, dr \quad (7)$$

where $a_2$ is given by: $n(a_2) = \frac{\beta}{k_0}$

The new variable $\mu$ can be understood as the total number of modes which have propagation constants larger than $\beta$. By differentiating the above equation, the group delay time, as a function of $\beta$, can be found to be:

$$\tau(\beta) = \frac{2k_0}{c\beta a_2^2} \int_0^{a_2} n^2 r \, dr \quad (8)$$

The bandwidth, f, can then be approximately calculated from the difference $\Delta$ in the maximum and minimum group delay times: f=0.44/$\Delta$t GHz·km, where $\Delta$t is expressed in nanoseconds.

The optimal steps in refractive index at the boundaries between the inner core and the outer core and between the outer core and the cladding of the optical fibers of the present invention can be determined by treating these steps as variables in the numerical calculations and by adjusting them to maximize the bandwidth.

Figure 4:
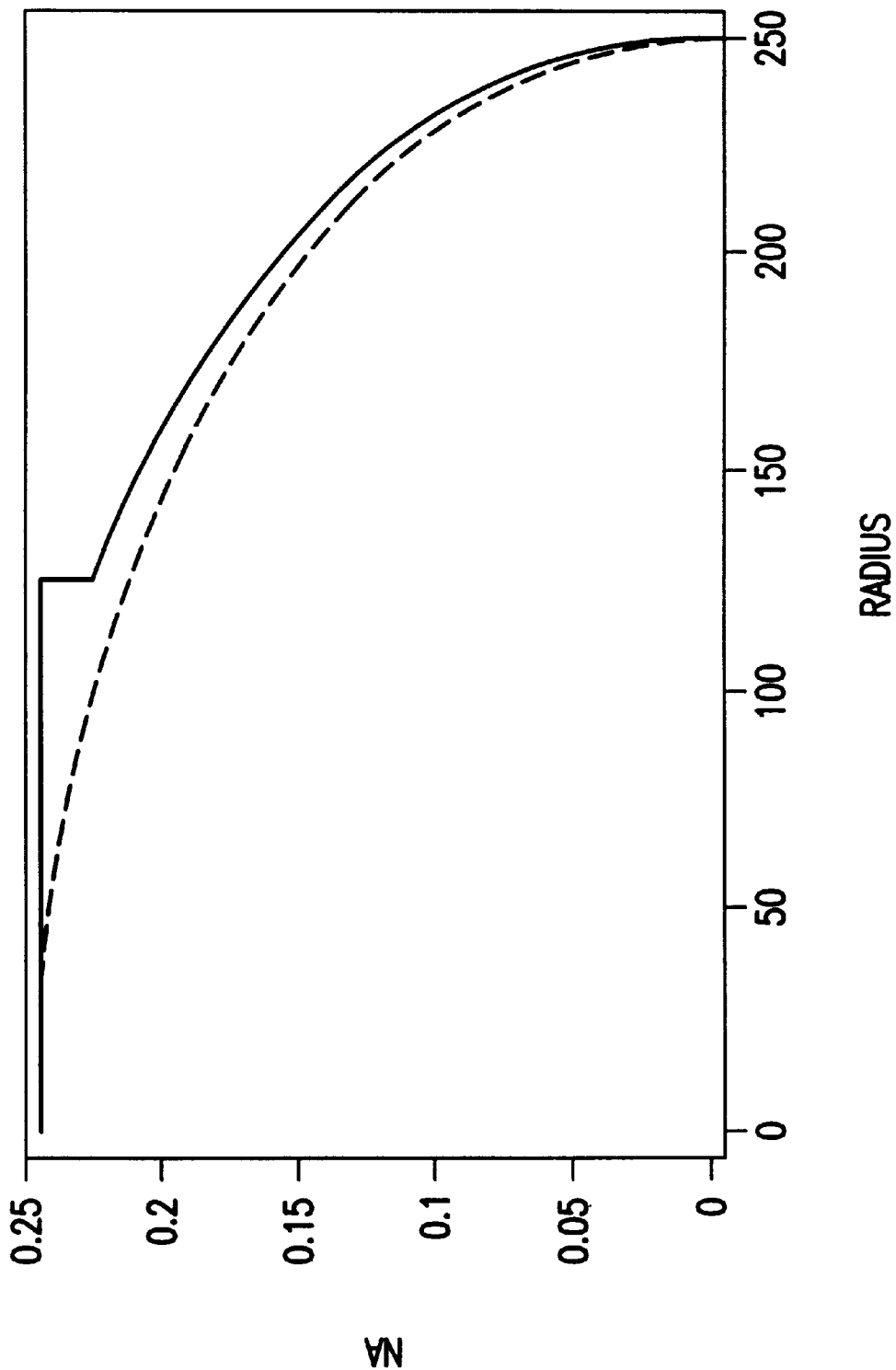
FIG. 4 shows the numerical aperture as a function of fiber radius for an exemplary optical fiber of the invention (solid line) and for a prior graded index fiber having a parabolic profile (dashed line).

Along with outstanding bandwidth performance, the optical fibers disclosed herein provide improved numerical apertures, especially over low numerical aperture step index optical fibers and graded index optical fibers. Since, numerical aperture is a measure of the acceptance angle over which light rays entering the fiber will be guided, a larger numerical aperture is preferred for several reasons. These include higher coupling efficiency, lower connection loss, and lower bending loss. The fibers of the present invention generally possess large numerical apertures compared to graded index fibers. FIG. 4 compares the numerical aperture of one embodiment of the fibers of the invention (solid line), having an inner core of uniform refractive index, with that of a graded index fiber having a parabolic profile (dashed line). The numerical aperture of the fiber of the invention is larger than that of the graded index fiber over the entire fiber radius, with the inner core region possessing the highest numerical aperture.

The fibers of the invention also have improved source-to-fiber coupling efficiencies compared to graded index fibers. Graded index fiber generally has lower source-to-fiber coupling efficiency than step index fiber. This arises from the refractive index profile of traditional graded index fiber, which continuously decreases from the fiber center to the cladding boundary. In such a profile, the light-collecting ability of the fiber degrades toward the cladding boundary, reducing the overall coupling efficiency. Additionally, if the incident light is off center because of misalignment, the coupling efficiency decreases because the area of highest numerical aperture is not fully utilized. In the fibers of the present invention, the inner core area, which possesses the highest numerical aperture, is significantly wider than many typical beam sizes. This mitigates the effects of misalignment, and allows source-to- fiber coupling efficiency of fibers of the invention to approach that of step index fiber.

Mismatch in numerical aperture when making fiber-to-fiber connections, couplings, or splicings, or fiber-to-optical device connection can introduce further coupling loss. When light exiting a fiber is coupled into a fiber or another optical device that is misaligned, only part of the light is successfully coupled into the fiber, or device. As described above, connection, coupling, or loss caused by misalignment is more severe for graded index fiber than for step index fiber, because of the smaller non-uniform numerical aperture over the graded core. For the fibers of the present invention, the mismatch caused by misalignment is significantly reduced because the inner core has a relatively wide diameter, and because the fiber has a relatively large numerical aperture. Thus, the fiber-to-fiber coupling loss and fiber-to-optical device loss for fibers of the invention are expected to be significantly lower than are seen for graded index fiber of comparable size.

A further advantage of the fibers of the invention is reduced bending loss. When light rays strike a bend in a fiber at an angle beyond the critical angle, they can "leak out", causing bending loss. Bending loss depends both on the bending radius of the fiber and on the refractive index distribution. For example, low numerical aperture step index fiber usually suffers appreciable bending loss because of weaker confinement of light. Accordingly, the fibers of the present invention, which have relatively wide cores and large numerical apertures, are expected to exhibit superior bending loss performance.

Another advantage of the fibers of the present invention is their ease of manufacture relative to graded index fibers. One difficulty encountered in the fabrication of graded index fiber is creation of the graded index profile over relatively large fiber radii, which can be as large as 100–1000 micrometers. It is particularly difficult to control the index profile at the center of the fiber and at the core-cladding boundary. These disadvantages are overcome by the fibers of the present invention which can be fabricated with existing methods and procedures readily available in the art.

For example, in some preferred embodiments of the invention, an inner core having a uniform refractive index is surrounded with a graded outer core, which spans a fiber radius. This is further surrounded with a cladding having a uniform refractive index. For fibers with the same sizecross section, since the graded outer core region of the fibers of the invention spans a smaller fiber radius than the graded portions of graded index fibers, control of the index profile in the graded outer core region of the fibers of the invention is significantly easier to achieve. Consequently, while traditional graded index fiber requires specialized manufacture, the fibers of the invention can be made more simply by any of several methods for optical fiber fabrification known in the art.

The graded index regions of the fibers of the invention can be any of the materials known in the art to be useful for the production of graded index portions of optical fibers. These include both polymer materials and glass materials, and their doped derivatives. Thus, the methods known in the art for fabrication of glass and polymer graded index fibers will find use in the present invention.

For polymeric graded index regions of fibers of the invention, suitable methods of fabrication include, for example, photo copolymerization, multi-stage copolymerization, centrifugal molding, interfacial gel copolymerization, photo locking, photo bleaching, and polymerization initiator diffusion.

Generally, copolymerization methods involve copolymerization of two or more kinds of reactive monomers, resulting in materials having different indices of refraction. It is generally known that in the copolymerization processes, there are essentially two basic mechanisms for forming a graded index profile: processes based on diffusion of monomers into or out of a polymeric composition or other substrate (referred to respectively as "in-diffusion" and "out-diffusion" processes), and processes utilizing differences in monomer reactivities.

Both the in-diffusion and out-diffusion processes involve the copolymerization of two monomers; a first monomer which is the monomer from which the polymer is formed, and a second monomer, which is different and therefore has a different refractive index. In the in-diffusion process, the second, different, monomer is made to diffuse into the partially polymerized first monomer. In the out-diffusion process, the second monomer is homogeneously doped into the polymer substrate monomer, and diffuses out from the surface of the substrate. At some point in the process, the second monomer is copolymerized with unreacted first monomer. Typically, in-diffusion processes produce fibers wherein the second monomer concentration decreases with increasing radius from the fiber axis, while the opposite is true for the out-diffusion process.

In so-called monomer reactivity processes, two or more monomers may be combined and copolymerized by irradiation with UV light to form the desired refractive index profile. Control of the reactive index profile is achieved by selection of several parameters, including the identities of specific monomers, the number of monomers, and other conditions of the polymerization. See, for example, L. Hornak, *Polymer for Lightwave and Integrated Optics: Technology and Applications*, Marcel Dekker, N.Y., 1992 at pp. 78–84, and the references cited therein. Additional suitable methodologies for preparation of graded index regions of optical fibers, including those of the present invention, are disclosed in, for example, *Plastic Optical Fibers and Application*, Vol. 25, Information Gatekeepers, Boston Mass. 1994, and Emslie, *Review of Polymer Optical Fibers, Journal of Material Science*, Vol. 23, 2281–2293 (1988).

For glass graded index regions of fibers of the invention, suitable methods of fabrication include, for example, chemical vapor deposition (see U.S. Pat. No. 3,711,262), vapor phase axial deposition (see U.S. Pat. No. 4,062,665), and their modifications (see S. E. Miller and I. P. Kaminow (eds.), *Optical Fiber Telecommunications II*, Academic Press, New York, N.Y., 1988). Each of the foregoing patents and publications are hereby incorporated in their entirety.

Generally, chemical vapor deposition methods involve introducing gases including, for example, Ge, Al, P, or B on to a heated silica glass surface and growing a dopant coating layer. Accordingly, the desired graded index can be obtained by controlling the dopant concentration. After the deposited dopant layer has fully grown, the glass preform can be melt drawn to produce a long thin optical fiber having a graded index region. Additional suitable methodologies for preparation of graded index regions of glass optical fibers, including those of the present invention, are disclosed in, for example, S. E. Miller and is I. P. Kaminow (eds.), *Optical Fiber Telecommunications II*, Academic Press, New York, N.Y., 1988.

Any of the several techniques for fabrication of glass or polymer optical fibers known in the art will find use in the fabrication of the fibers of the present invention. Additionally, the present invention provides novel coating, extrusion, and drawing methods for the manufacture of fibers of the invention having an inner core with a smoothly varying or substantially uniform refractive index; an outer core on the inner core, the outer core having a refractive index that is lower than the refractive index of the inner core, and which decreases smoothly, monotonically and nonlinearly with increasing fiber radius; and a cladding layer on the outer core, the cladding layer having a substantially uniform refractive index which is equal to or slightly greater than the refractive index of the outer core at the boundary of the outer core and the cladding layer. The coating method for the production of fibers of the invention comprises the steps of:

forming an inner core fiber;
establishing a graded refractive index or a substantially uniform refractive index in the inner core fiber;
forming an outer core fiber by coating the inner core fiber with a composition suitable for establishing a smoothly varying graded refractive index; establishing the smoothly varying graded refractive index in the outer core fiber; forming a cladding layer on the outer core fiber by coating the outer core fiber with a single material or uniform mixture having a constant refractive index; and curing the cladding layer by UV curing, thermal curing, or by cooling.

The inner core fiber with a smoothly varying or substantially uniform refractive index can be formed using fiber extrusion or fiber drawing processes known in the art. For inner cores having a substantially uniform refractive index, a single material or uniform mixture having a constant refractive index may be used. Materials for forming inner cores having a smoothly varying graded refractive index include those suitable for use in the production of graded indices as described above for the formation of outer cores of the invention.

The graded refractive index, or substantially uniform refractive index, can be established in the inner core fiber by, for example, standard melt drawing from a glass preform, according to procedures known in the art, as appropriate for the particular material or mixture disclosed in, for example, S. E. Miller and A. G. Chynoweth (eds.), *Optical Fiber Telecommunications*, Academic, NY, 1979 and S. E. Miller and I. P. Kaminow (eds.), *Optical Fiber Telecommunications*

II, Academic Press, New York , N.Y., 1988,. The graded refractive index, or substantially uniform refractive index, can be established in a polymer inner core fiber by melt drawing from a plastic preform, or by fiber extrusion methods, disclosed in, for example, *Plastic Optical Fibers and Application*, Vol. 25, Information Gatekeepers, Boston Mass. 1994, and L. A. Hornak, *Polymers for Lightwave and Integrated Optics: Technology and Applications*, Marcel Dekker, N.Y. 1992, the disclosures of which are each incorporated herein in their entirety.

The graded refractive index can be established in a glass outer core fiber by, for example, standard melt drawing from a glass preform, according to procedures known in the art, as appropriate for the particular material or mixture disclosed in, for example, S. E. Miller and A. G. Chynoweth (eds.), *Optical Fiber Telecommunications*, Academic, NY, 1979 and S. E. Miller and I. P. Kaminow (eds.), *Optical Fiber Telecommunications II*, Academic Press, New York , N.Y., 1988.

The outer core can be formed by coating the inner core fiber with a composition suitable for forming a smoothly varying graded refractive index, such as those described above. Techniques for coating the inner core fiber include, for example, extrusion coating with thermal or UV curable polymer formulations, or using hot-melt thermoplastic compounds, or using sol-gel glass formulations. See for example Konishi, S. et al., *J. Non-Cryst. Solids*, Vol. 100 511–513 (1988). Additional suitable methodologies for preparation of graded index regions of optical fibers, including those of the present invention, are disclosed in, for example, M. J. Bowden and S. R. Thunrer, *Polymers for High Technology*, American Chemical Society, Washington, 1487, and *Plastic Optical Fibers and Application*, Vol. 25, supra.

The graded index can be established in a glass outer core fiber by any of several techniques known in the art for forming graded index fibers by standard melt drawing from a glass preform, such as, for example, outside vapor phase oxidation, chemical vapor deposition and modifications, and vapor axial deposition methods, and atomic diffusion processes, as disclosed in, for example, S. E. Miller and A. G. Chynoweth (eds.), *Optical Fiber Telecommunications*, Academic, NY, 1979 and S. E. Miller and I. P. Kaminow (eds.), *Optical Fiber Telecommunications II*, Academic Press, New York , N.Y., 1988.

The graded index can be established in a polymer outer core fiber by any of several techniques known in the art for forming graded index fibers, such as, for example, photo copolymerization, multi-stage copolymerization, centrifugal molding, interfacial gel copolymerization, photo-locking, photo-bleaching, and polymerization initiator diffusion.

The cladding layer is then formed by coating the outer core with either a single material, or uniform mixture. In preferred embodiments the single material or uniform mixture produces a cladding having a constant refractive index. Techniques for coating the outer core fiber include those used routinely in the art to clad fibers, similar to the techniques used for the outer core.

The cladding layer is then processed by UV or thermal curing, or by cooling, as appropriate to the particular material or mixture.

The present invention further provides extrusion processes for the manufacture of fibers of the invention having an inner core with a smoothly varying or substantially uniform refractive index, an outer core surrounding the inner core and having a refractive index that is lower than the refractive index of the inner core, and that decreases smoothly, monotonically and nonlinearly with increasing fiber radius, and a cladding layer surrounding the outer core, preferably having a uniform refractive index. The extrusion process conveniently comprises the steps of:

forming a fiber preform by co-extrusion or sequential extrusion of an inner core layer, an outer core layer, and a cladding layer, wherein the inner core layer possesses a smoothly varying or substantially uniform index of refraction, the outer core layer possesses a lower, smoothly varying, graded index of refraction, and the cladding layer possesses a uniform index of refraction, wherein the lowest refractive index of the inner core is higher than the highest refractive index of the graded outer core, and the lowest refractive index of the outer core is lower than the refractive index of the cladding layer; and curing the fiber preform to produce the fiber.

The polymer materials suitable for inner cores, outer cores, and cladding layers of the fibers produced by the process are the same as those described above.

Formation of the fiber by co-extrusion or sequential extrusion of an inner core layer, an outer core layer, and a cladding layer can be achieved by co-extrusion or sequential extrusion techniques known in the art. See, for example, *Polymers for Lightwave and Integrated Optics*, supra, at p. 4–7, and references cited therein; U.S. Pat. No. 5,235,660 and references cited therein. See also Ho, et al., *Polymer Journal* Vol. 27, No. 3, pp. 310–313 (1995) which discloses a closed extrusion process for the preparation of graded index polymer fibers.

The present invention also provides a drawing process for the manufacture of fibers having an inner core with a smoothly varying or substantially uniform refractive index; an outer core surrounding the inner core and having a lower refractive index that decreases smoothly, monotonically and nonlinearly with increasing fiber radius; and a cladding layer surrounding the outer core and having a uniform refractive index. The drawing process conveniently comprises the steps of:

forming an optical preform rod fiber consisting of an inner core layer, an outer core layer, and a cladding layer, wherein the inner core layer has a smoothly varying or substantially uniform index of refraction, the outer core layer has a lower, smoothly varying graded index of refraction, and the cladding layer has a uniform index of refraction, wherein the lowest refractive index of the inner core is higher than the highest refractive index of the graded outer core, and the refractive index of the cladding layer is greater than the refractive index of the outer core at the boundary of the outer core and the cladding layer;

heating the preform to a temperature required for drawing;

drawing the heated preform into a optical fiber of predetermined diameter; and cooling the optical fiber The materials suitable for use in the drawing process of the invention are the same as those for the other processes of the invention described herein.

The fabrication and melt drawing of preforms are disclosed, for example, for glass preforms in S. E. Miller and A. G. Chynoweth (eds.), *Optical Fiber Telecommunications*, Academic, NY, 1979 and S. E. Miller and I. P. Kaminow (eds.), *Optical Fiber Telecommunications II*, Academic Press, New York , N.Y., 1988, and for polymer preforms, in C. Emslie, *Review of Polymer Optical Fibers, Journal of Material Science*, Vol. 23, 2281–2293 (1988) and L. Hornak,

*Polymer for Lightwave and Integrated Optics: Technology and Applications*, supra. Coating methods for application of cladding layer to the formed optical fiber are described in the above respective references for glass and polymer materials.

Other methodologies for manufacture of optical fibers of the invention will be apparent to those of skill in the art. For example, Perry et al., U.S. Pat. No. 5,235,660, discloses a process for the manufacture of multilayer polymer optical fibers having graded refractive index profiles. In this process a preform polymer optical fiber is first produced by extrusion of layers of polymer materials and an outer cladding layer of a polymer material. The perform polymer optical fiber is then cooled, and subsequently heated to a 4 temperature sufficient to effect fusing of the polymer layers at their boundaries. The heated preform polymer optical fiber is then drawn to a predetermined diameter, and cooled to yield a fiber having the desired characteristics. Those of skill in the art will appreciate that such a process could be used to produce the optical fibers of the present invention, by selection of appropriate starting polymers for multiple layer extrusion, and subsequent processing.

Polymer optical fibers of the invention may also be manufactured by an interfacial gel copolymerization process. Such a process can utilize both diffusion and monomer reactivities. Typically a monomer mixture is placed in a hollow tube formed of bulk polymer. The gel phase is formed on the inner wall of the tube, which is slightly swollen by the monomer mixture. Heating of the assembly induces formation of the copolymer phase from the inner wall of the tube to the center axis. It is thought that once the copolymer phase has initially formed from the gel phase, the graded index is formed by a mechanism similar to that of photocopolymerization, or by gradual diffusion of polymer molecules dissolved from the tube into the center. See *Polymer for Lightwave and Integrated Optics*, supra, at p. 89.

In other known methodologies, a graded index preform rod, obtained by photocopolymerization and interfacial gel copolymerization, is heat drawn at high temperature into a graded index polymer optical fiber. See *Polymers for Lightwave and Integrated Optics*, supra, at pp. 96–100, and the references cited therein.

Additionally, optical fibers of the present invention may be fabricated by drawing of a preform manufactured according to vapor axial deposition, chemical vapor deposition, or modifications in the art. See, for example, S. E. Miller and A. G. Chynoweth (eds.), *Optical Fiber Telecommunications*, Academic, NY, 1979 and S. E. Miller and I. P. Kaminow (eds.), *Optical Fiber Telecommunications II*, Academic Press, New York, N.Y., 1988, which disclose graded index optical fibers prepared by such processes.

The fibers of the present invention may be fabricated from any of a variety of materials known to be useful in the production of optical fibers. Accordingly, the fibers of the invention can be glass, or non-glass materials such as, for example, organic polymers. Fibers according to the invention can also have both glass and polymer components. For example, in one preferred embodiment of the invention, the inner core is a glass rod having a substantially uniform refractive index, and the outer core and cladding layers are polymer compositions. Glass materials suitable for use in the optical fibers of the invention can be any of the wide variety of glass compositions which are known to be useful in production of optical fibers. Representative examples of suitable glass compositions include those found in S. E. Miller and A. G. Chynoweth (eds.), *Optical Fiber Telecommunications*, Academic, NY, 1979 and S. E. Miller and I. P. Kaminow (eds.), *Optical Fiber Telecommunications II*, Academic Press, New York, N.Y., 1988.

Polymer materials for use in the optical fibers of the invention are chosen to have low loss, and can be any of the wide variety of optical polymer compositions which are known to be useful in production of optical fibers. A representative list of suitable monomeric and polymeric compositions includes polycarbonates, polyesters, polyolefins, polystyrenes, particularly poly (methylmethacrylate), polystyrene, copolymers of methylmethacrylate and vinyl phenyl acetate (P(MMA-VPAc)), copolymers of methylmethacrylate and vinyl benzoate (P(MMA-VB)), methyl methacrylate styrene, acetonitrile butadiene styrene, and styrene acrylonitrile. Further suitable monomers and polymeric compositions can be found in *Plastic Optical Fibers and Application*, Vol. 25, supra, and L. A. Hornak, *Polymers for Lightwave and Integrated Optics: Technology and Applications*, supra, for example at page 80.

Preferred embodiments of the optical fibers of the present invention have a cladding layer on the outer core. The cladding layers of the fibers of the invention can be any of the materials known to be useful for fiber optic claddings. A representative list of suitable cladding materials includes organic polymers such as copolymers of vinylidene fluoride and tetrafluorethylene, and fluoroalkyl methacrylate polymers. Other suitable components for cladding layers of glass-containing optical fibers are disclosed, for example, in S. E. Miller and A. G. Chynoweth (eds.), *Optical Fiber Telecommunications*, Academic, New York, N.Y., 1979 and S. E. Miller and I. P. Kaminow (eds.), *Optical Fiber Telecommunications II*, Academic Press, New York, N.Y., 1988. Further suitable components for cladding layers of polymer optical fibers are disclosed, for example, in C. Emslie, Review of Polymer Optical Fibers, *Journal of Material Science*, Vol. 23, 2281–2293 (1988); L. Hornak, *Polymer for Lightwave and Integrated Optics: Technology and Applications*, Marcel Decker, N.Y., 1992; and *Plastic Optical Fibers and Application*, Vol. 25, Information Gatekeepers, Boston Mass. 1994. The disclosures of each of the foregoing references are herein incorporated in their entirety.

While preferred embodiments of the optical waveguides of the invention are optical fibers, other embodiments of the invention include thin films and other optical waveguide elements, such as lenses. Such optical waveguides having the novel refractive index profile of the invention can be circular or noncircular, and can have any of a variety of geometric forms, such as spheroid, cylindrical, or toroid.

Additional objects, advantages, and novel features of this invention will become apparent to those skilled in the art upon examination of the following examples thereof, which are not intended to be limiting.

EXAMPLE 1

Optimized Refractive Index Profile with Maximum Optical Bandwidth Performance

The optical fiber of the present invention is chosen such that for $n_0=n_1=1.50$ and $n_3=n_4=1.48$, the fiber has minimal dispersion and, hence, maximum bandwidth. The size of the index step at the boundary of the inner core and outer core and the functional form of the graded outer core are optimized using WKB analysis.

The group delay time for a mode can be expressed as:

$$\tau = -\frac{1}{c}\frac{\partial m/\partial k_0}{\partial m/\partial \beta} \qquad (9)$$

If we require that there is no dispersion in the group delay time, then the right-hand side of Equation 9 is a constant, which leads to the following differential equation:

$$\frac{\partial m}{\partial k_0} + n_{av}\frac{\partial m}{\partial \beta} = 0 \qquad (10)$$

where $n_{av}=ct$ is the average refractive index of the graded The general solution to the above differential equation is:

$$m = f(n_{av}k_0 - \beta) \qquad (11)$$

where f can be any arbitrary function. It can be proven that, in order to satisfy Equation 7 and Equation 11, the optimized profile with minimal group delay time dispersion must satisfy:

$$\int_0^{a_2}(n(r)^2 - n(a_2)^2)r\,dr = C_1(n_{av} - n(a_2))^2 \qquad (12)$$

where $C_1$ is an undetermined constant. By differentiating the above equation with respect to $a_2$, we get:

$$\frac{dn}{da_2}a_2^2 n = 2C_1(n_{av} - n)\frac{dn}{da_2} \qquad (13)$$

Cancellation of the differentiation term, $dn/da_2$, and replacing $a_2$ by r, gives the following optimal profile:

$$n(r) = \frac{n_{av}}{1 + C_2 r^2} \qquad (14)$$

The average refractive index, $n_{av}$, can be determined by the fact that group delay time for rays at the inner edge of the outer core is the same as for rays of the inner core which have the largest angle of propagation. For such a ray, the angle with respect to the fiber axis is: $\cos\theta = n_2/n_0$, and the group delay time is:

$$\frac{n_0^2}{n_2 c},$$

which leads to $$n_{av} = \frac{n_0^2}{n_2}.$$

By the fact that at $r=r_1$, $n=n_2$, the other constant $C_2$ is determined to be:

$$C_2 = \left(\frac{n_0^2}{n_2^2} - 1\right)\frac{1}{r_1^2}.$$

The optimal refractive index profile in the graded outer core is, therefore, given by:

$$n(r) = \frac{\frac{n_0^2}{n_2}}{1 + \left(\frac{n_0^2}{n_2^2} - 1\right)\left(\frac{r}{r_1}\right)^2} \qquad (15)$$

The refractive index, $n_2$, at the boundary of the inner core and the outer core is determined by requiring that index given by Equation 15 equals to that of the cladding index, $n_4$, at the cladding boundary.

Figure 5:
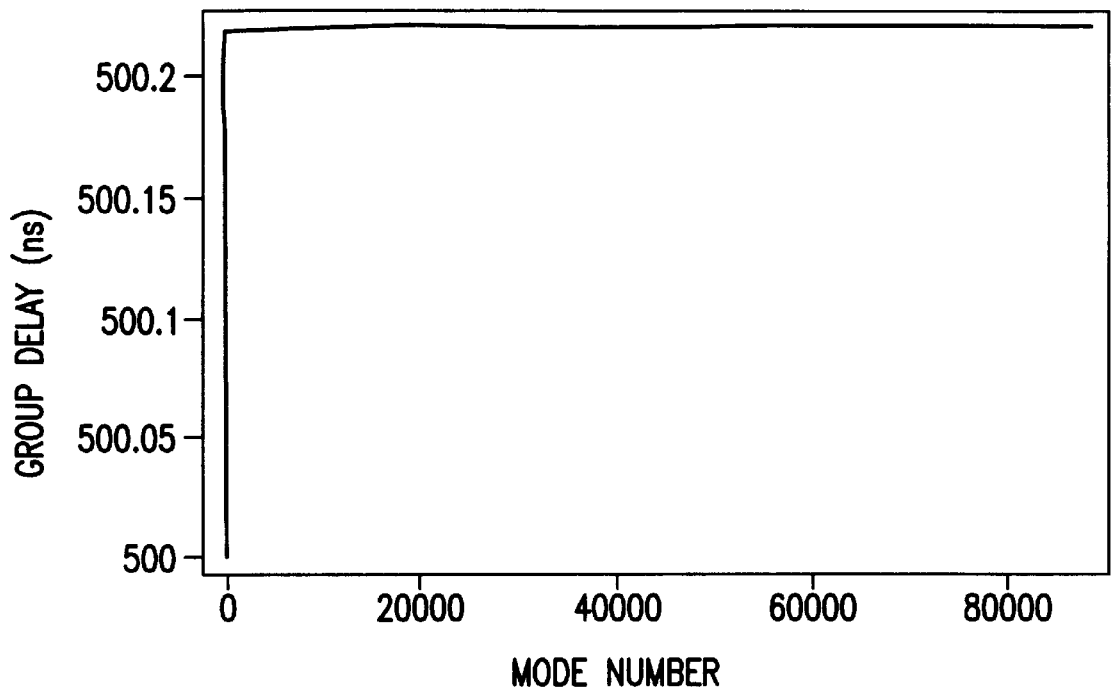
FIG. 5 shows a group delay time dispersion spectrum, where group delay time for a 100 m long fiber is plotted as a function of mode number.

For an inner core radius of $r_1=62.5$ μm, an outer core radius $r_2=250$ μm, and a total fiber radius $R=500$ μm, and with the maximum outer core refractive index, as determined using Equation 15, $n_2=1.499$, the bandwidth is calculated to be 2.0 GHz·100 m. The bandwidth is determined through analysis of the group delay time dispersion spectrum shown in FIG. 5. where group delay time for a 100 m long fiber is plotted as a function of mode number.

EXAMPLE 2

Dependence of optical bandwidth on ratio of inner core/outer core radii

The optical fiber of the present invention is chosen such that for $n_0=n_1=1.50$ and $n_3=n_4=1.48$, the outer core of the fiber has the following optimal functional form $$n(r) = \frac{\frac{n_0^2}{n_2}}{1 + \left(\frac{n_0^2}{n_2^2} - 1\right)\left(\frac{r}{r_1}\right)^2} \quad \text{for } r_1 < r < r_2 \qquad (15)$$

The refractive index, $n_2$, at the boundary of the inner core and the outer core is determined by requiring that index given by Equation 15 equals to that of the cladding index, $n_4$, at the cladding boundary.

Figure 6:
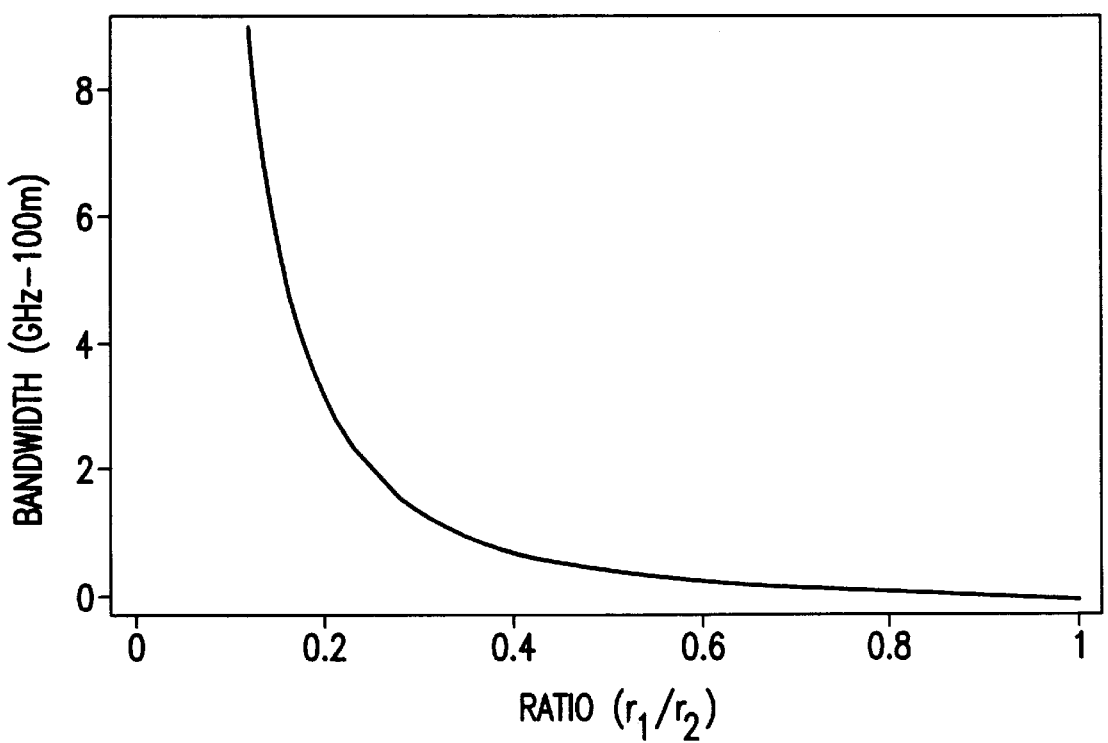
FIG. 6 shows the bandwidth dependence on the inner core radius to outer core radius ratio for a fiber in accordance with certain embodiments of the invention.

The group time delay dispersion is calculated using WKB analysis for fibers with varying ratios of inner core to outer core radii. Calculation is carried out for fibers having an outer core radius $r_2=250$ μm and a total fiber radius $R=500$ μm. Analysis of such group time delay dispersion data leads to a dependence of bandwidth on the ratio of the inner core radius, $r_1$, to the outer core radius, $r_2$. The bandwidth dependence on the inner core radius to outer core radius ratio is displayed in FIG. 6. Bandwidths for the fibers of this invention are typically greater than 1 GHz·100 m and can exceed 10 GHz·100 m by appropriate choice of inner core and outer core radii.

EXAMPLE 3

Figure 7:
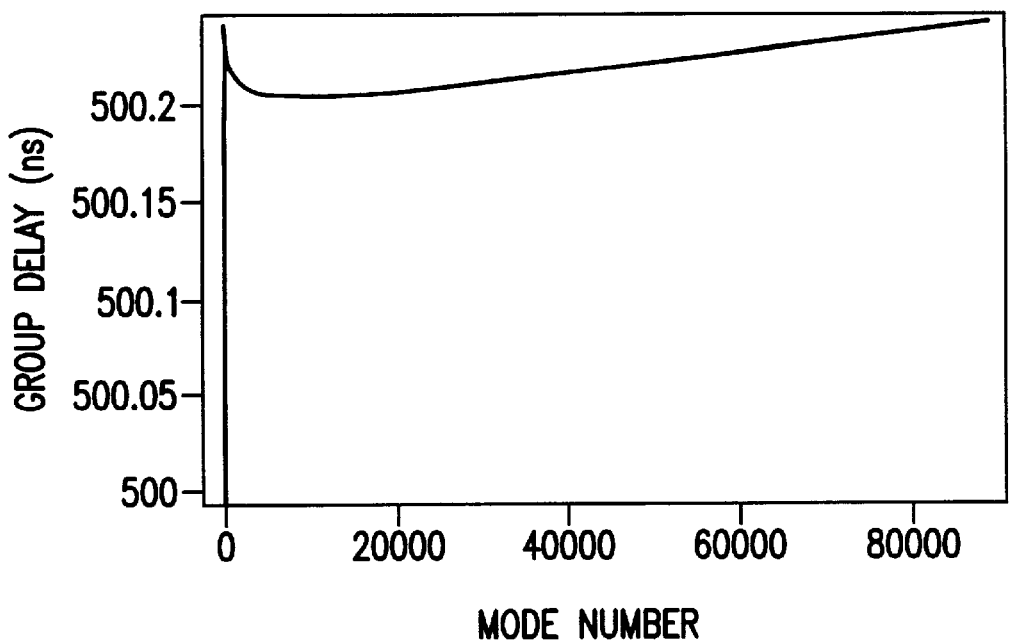
FIG. 7 shows a group delay time dispersion spectrum for the parabolic outer core profile described in Example 3, where group delay time for a 100 m long fiber is plotted as a function of mode number.

Compensating Variations in Graded Outer Core by Optimizing Refractive Index Step Size at Inner Core/Outer Core Boundary The optical fiber of the present invention is chosen such that for $n_0=n_1=1.50$ and $n_3=n_4=1.48$, the outer core of the fiber has the following parabolic functional form $$n^2(r) = n_2^2 - (n_2^2 - n_4^2)\left(\frac{r - r_1}{R - r_1}\right)^2 \quad \text{for } r_1 < r < r_2 \qquad (16)$$

where $n_2$ is determined by minimizing the time delay dispersion using WKB analysis. For an inner core radius of $r_1=62.5$ μm, an outer core radius $r_2=250$ μm, and a total fiber radius R=500 μm, such minimization yields a bandwidth of 1.83 GHz·100 m. The bandwidth is determined through analysis of the group delay time dispersion spectrum shown in FIG. 7, where group delay time for a 100 m long fiber is plotted as a function of mode number. The bandwidth for this parabolic outer core profile is nearly the same as that for the optimum profile of Example 1 because the refractive index step size at the boundary of the inner core and outer core has been optimized for minimum dispersion. Therefore, variations in the functional form of the graded outer core can be compensated by optimizing the index step size.

EXAMPLE 4

Dependence of Refractive Index Step Size at Inner Core/Outer Core Boundary for Optical Bandwidth Performance The optical fiber of the present invention is chosen such that for $n_0=n_1=1.50$ and $n_3=n_4=1.48$, the outer core of the fiber has the following parabolic functional form $$n^2(r)=n_0^2-(n_0^2-n_4^2)(r/R)^2 \text{ for } r_1<r>r_2 \qquad (17)$$

Figure 8:
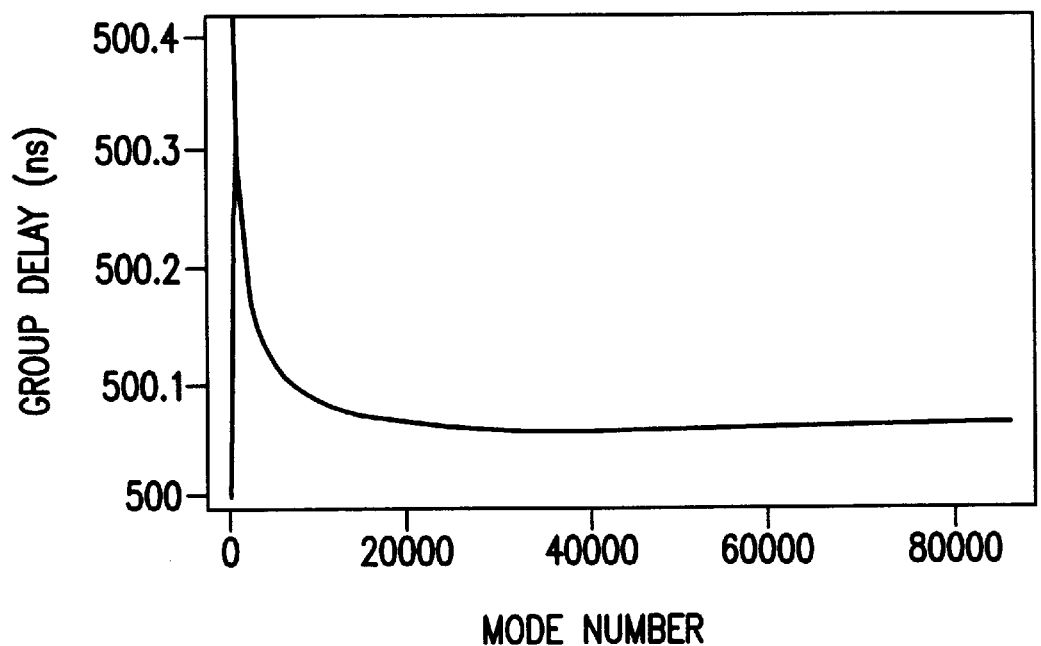
FIG. 8 shows a group delay time dispersion spectrum for the outer core profile described in Example 4, where group delay time for a 100 m long fiber is plotted as a function of mode number.

The outer core profile of this example has the same functional dependence as that of Example 3, but has a different, non-optimized, index of refraction step size at the boundary of the inner core and outer core. The delay time dispersion is again calculated by WKB analysis. For an inner core radius of $r_1=62.5$ μm, an outer core radius $r_2=250$ μm, and a total fiber radius R=500 μm, such analysis yields a bandwidth of 1.05 GHz·100 m. The bandwidth is determined through analysis of the group delay time dispersion spectrum shown in FIG. 8, where group delay time for a 100 m long fiber is plotted as a function of mode number. The decrease in bandwidth as compared to Example 3 reveals that it is very important to optimize the refractive index step size at the boundary of the inner core and outer for maximum bandwidth performance.

EXAMPLE 5

Figure 9A:
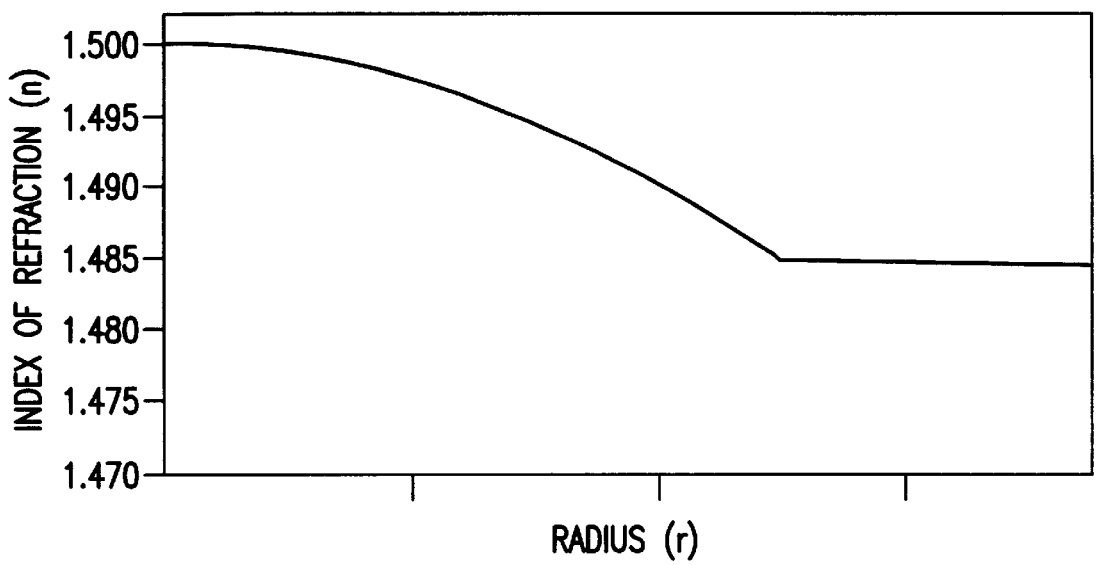
FIGS. 9a and 9b show, respectively, refractive index profile lacking a step and containing a step in refractive index at the core-cladding boundary, as described in Example 5.
Figure 9B:
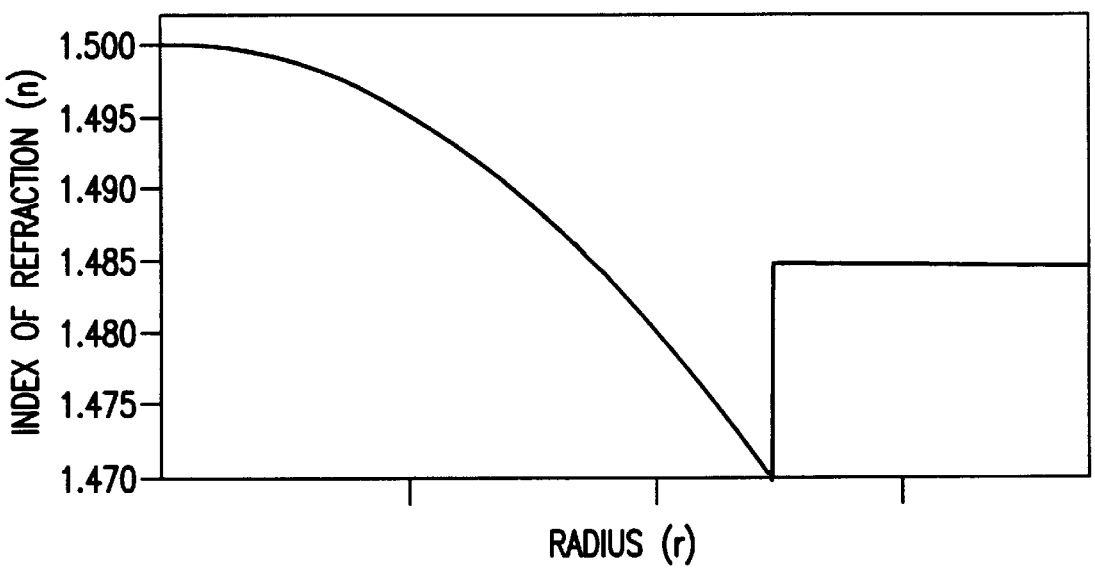
Figures 10A, 10B:
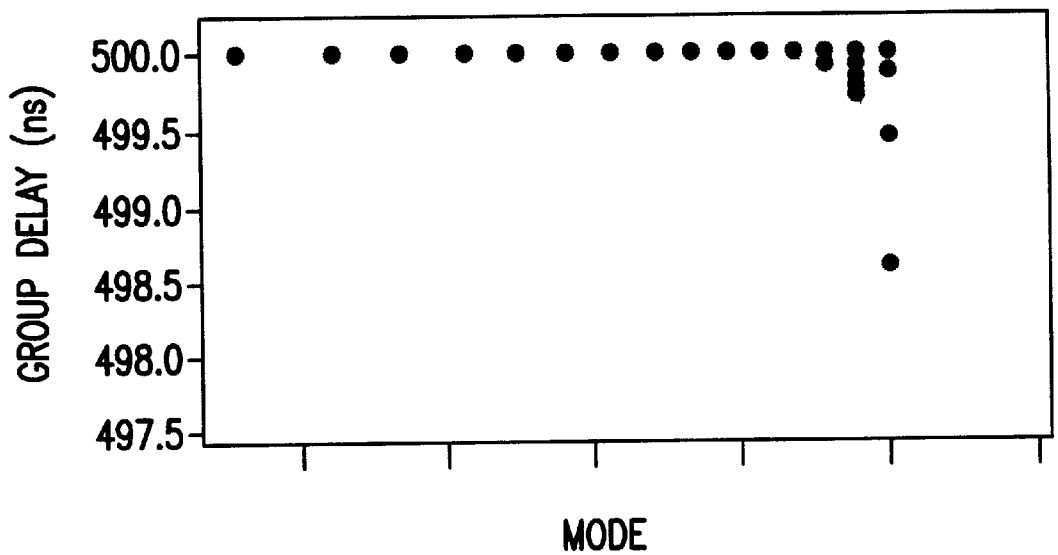
FIGS. 10a and 10b show the group time delay dispersion spectra for the two refractive index profiles shown in FIGS. 9a and 9b.

Optimized Refractive Index Step Size at Outer Core/Cladding Boundary for Maximum Optical Bandwidth Performance The preceding examples illustrate the importance of the step in refractive index at the boundary of the inner core and outer core in generating maximum bandwidth. This example serves to demonstrate the importance of the step in refractive index at the boundary of the outer core and cladding. To this end, the group time delay dispersion spectra for the two refractive index profiles shown in FIG. 9 are calculated and compared. Numerical analysis is performed using a power series method. The optical fibers of the present invention are chosen such that their index of refraction profiles, n(r), follow the form $$n(r) = n_1\left[1 - 2\rho\left(\frac{n_1 - n_4}{n_4}\right)^2\right]^{1/2} \qquad (18)$$

where $n_1$ and $n_4$ are the center and cladding refractive indexes, respectively, and r is a parameter which varies the extent of the index step at the cladding. For no index step, FIG. 9(a), r=1, and for the optimal step, FIG. 9(b), r=2. The center and cladding indexes are chosen to be $n_1=1.50$ and $n_2=1.48$, respectively, with the normalized frequency $$v = \sqrt{n_1^2 - n_4^2}\, 2\pi\frac{a}{\lambda} \qquad (19)$$

taken to be 30. FIG. 10 displays the group time delay dispersion spectra for the two cases. It is evident that the time delay dispersion for the profile having a refractive index step at the cladding, FIG. 10(b), is much less than that for the profile without such a step, FIG. 10(a). Consequently, the bandwidth performance is significantly improved by more than an order of magnitude by including and optimizing the step in refractive index at the boundary between the outer core and the cladding.

EXAMPLE 6

Finite Element Analysis for Optimizing Refractive Index Profile

This example demonstrates the importance of the step in the refractive index at the boundary of the outer core and cladding. The finite element analysis technique was implemented in order to calculate the group delay for any arbitrary index profile. The optical fiber of the invention is chosen such that the inner core ($r<r_1$) is flat with $n_0=n_1=1.50$ while the cladding index is $n_4=1.48$. In addition, it is chosen such that the outer core radius $r_2=4r_1$. In the outer core region, the index profile n(r) satisfies the following equation $$n^2(r) = \frac{16n_2^2 - n_3^2}{15} - \frac{16n_2^2 - 16n_3^2}{15}\left(\frac{r}{r_2}\right)^2 \qquad (20)$$

where $n_2=1.499$ is fixed throughout this example and $$n_3=n_4-(\rho-1)(n_1-n_4). \qquad (21)$$

Figure 11:
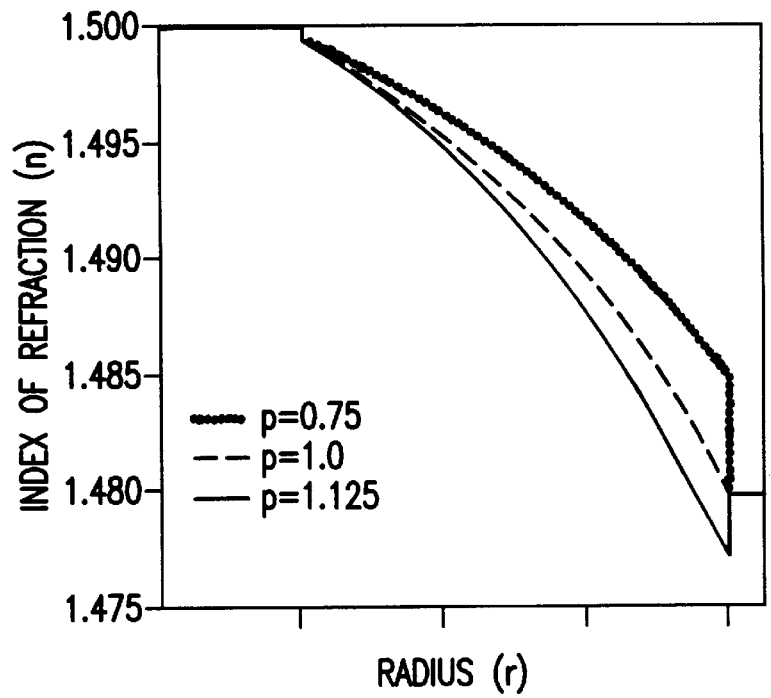
FIG. 11 shows the three refractive index profiles described in Example 6, where the ratio of the outer core to inner core radii is three to one.

The difference between $n_3$ and $n_4$ corresponds to the step at the outer core-cladding boundary. If $\rho=1$, there is no discontinuity at the boundary. If $\rho<1$, there is a step, and if $\rho>1$, there is an optimal step at the boundary. FIG. 11 shows the refractive index profiles for three case, $\rho=0.75, 1.00$, and 1.125.

Figure 12:
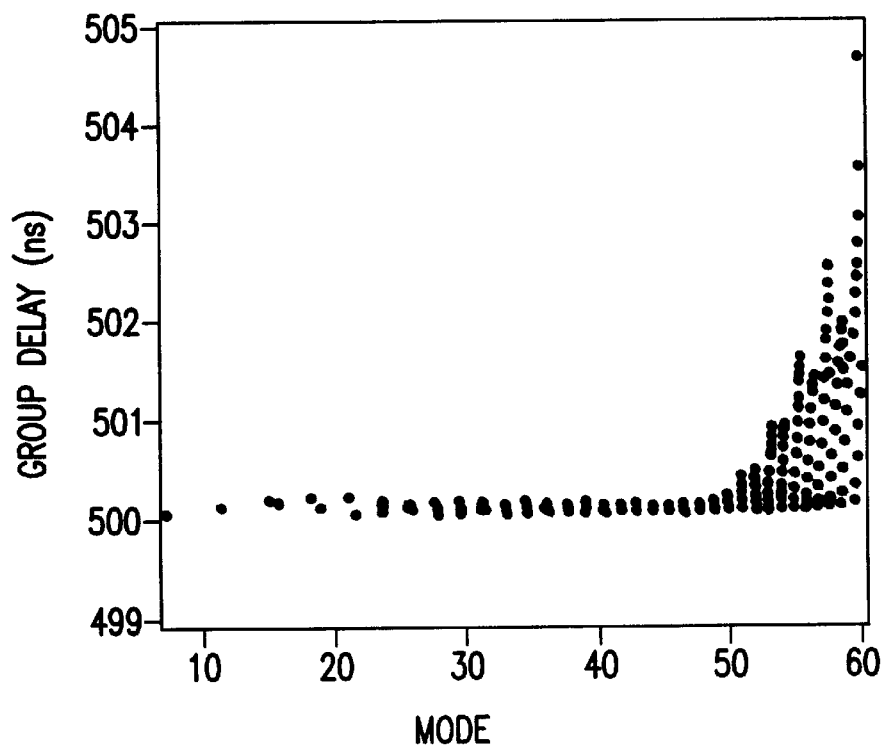
FIGS. 12, 13, and 14 show group delay time spectra for the refractive index profiles described in Example 6, where group delays for 100 m long fibers are plotted as a function of mode number.
Figure 13:
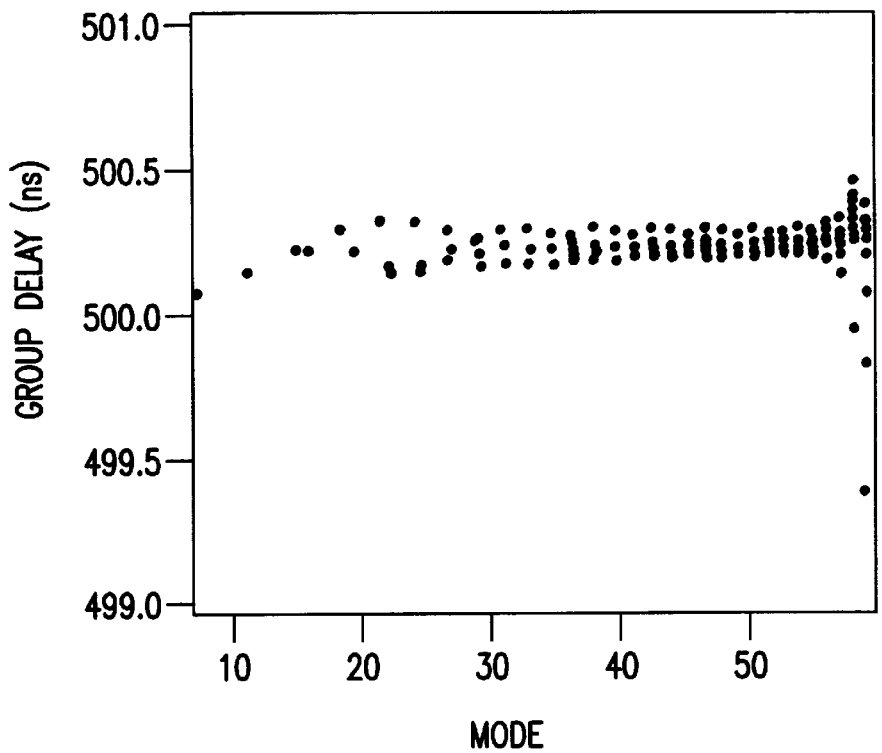
Figure 14:
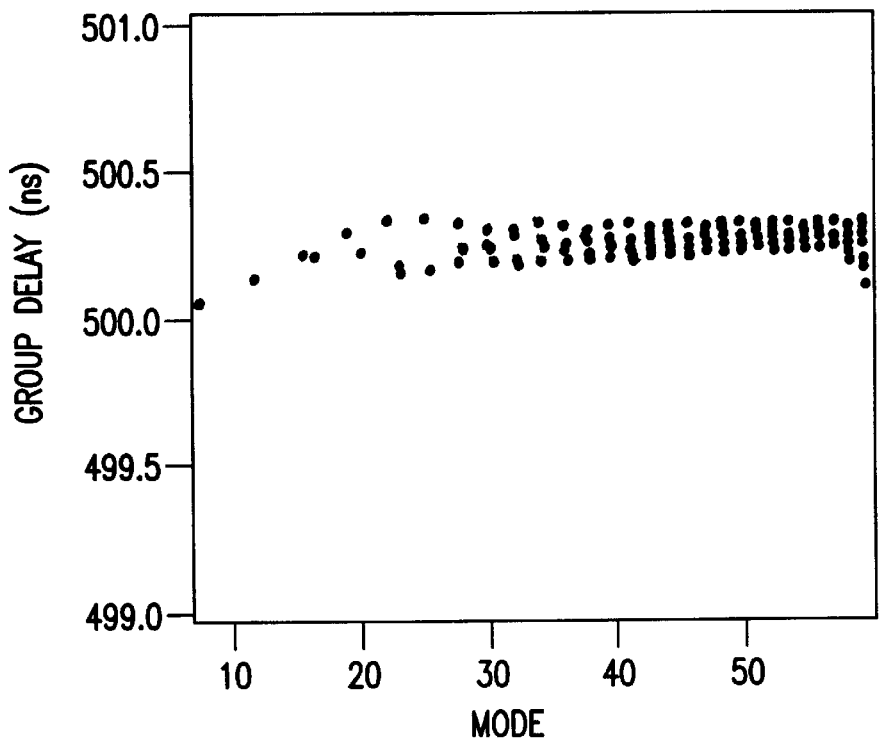

In FIGS. 12–14 the group delay spectra are plotted for $\rho=0.75, 1.00$, and 1.125, respectively. It is obvious that FIG. 14 corresponds to the minimum group delay and maximum bandwidth. These figures clearly demonstrate that with an appropriate value for $\rho$, the bandwidth performance can be further improved. This is because without a step, corresponding to $\rho=1$, modes near cut-off tend to possess large group delays. The introduction of a step ($\rho>1$) suppresses these modes. Therefore, the overall group delay is significantly reduced.

EXAMPLE 7

Figure 15:
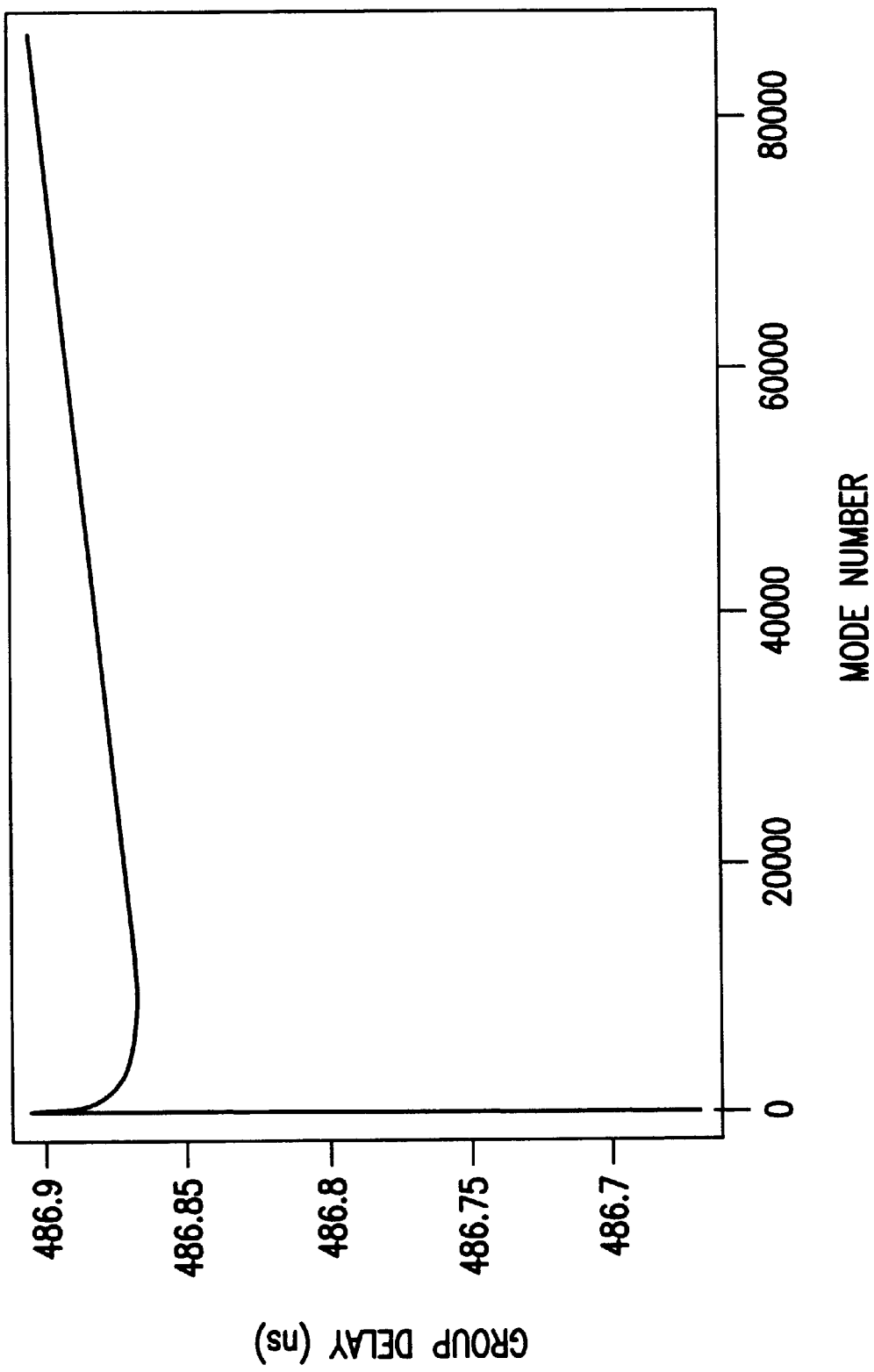
FIG. 15 shows a group delay time dispersion spectrum for the outer core profile described in Example 7, where group delay time for a 100 m long fiber is plotted as a function of mode number.

Compensating Variations in Graded Outer Core by Optimizing Refractive Index Step Size at Inner Core/Outer Core Boundary In this example, the refractive index profile has the same shape as the one demonstrated in Example 3. The optical fiber is chosen such that for $n_0=n_1=1.46$ and $n_3=n_4=1.44$, the outer core of the fiber follows the parabolic functional form of equation 16. For an inner core radius of $r_1=62.5$ μm, an outer core radius $r_2=250$ μm, and a total fiber radius R=500 μm, such minimization yields a bandwidth of 1.85 GHz·100 m. The bandwidth is determined through analysis of the group delay time dispersion spectrum shown in FIG. 15, where group delay time for a 100 m long fiber is plotted as a function of mode number. The bandwidth for this parabolic outer core profile is nearly the same as the one in Example 3.

It is intended that each of the published documents mentioned in this specification be herein incorporated by reference in their entirety.

Those skilled in the art will appreciate that numerous changes and modifications may be made to the preferred embodiments of the invention and that such changes and modifications may be made without departing from the spirit of the invention. It is therefore intended that the appended claims cover all equivalent variations as fall within the true spirit and scope of the invention.

What is claimed is:

1. A method for the preparation of an optical fiber having an inner core with a smoothly varying or substantially uniform index of refraction; an outer core on the inner core, the outer core having a refractive index that is lower than the refractive index of the inner core and which decreases smoothly, monotonically and nonlinearly with increasing fiber radius; and a cladding layer on the outer core, the cladding layer having a substantially uniform refractive index which is greater than the refractive index of the outer core at the boundary of the outer core and the cladding layer; comprising the steps of:

forming an inner core fiber;

establishing a graded refractive index or a substantially uniform refractive index in the inner core fiber;

forming an outer core fiber by coating the inner core fiber with a composition suitable for establishing a smoothly varying graded refractive index;

establishing the smoothly varying graded refractive index in the outer core fiber;

forming a cladding layer on the outer core fiber by coating the outer core fiber with a single material or uniform mixture having a constant refractive index; and curing the cladding layer by UV curing, thermal curing, or by cooling.

2. A method for the preparation of an optical fiber having an inner core with a smoothly varying or substantially uniform index of refraction; an outer core on the inner core, the outer core having a refractive index that is lower than the refractive index of the inner core and which decreases smoothly, monotonically and nonlinearly with increasing fiber radius; and a cladding layer on the outer core, the cladding layer having a substantially uniform refractive index which is greater than the refractive index of the outer core at the boundary of the outer core and the cladding layer; comprising the steps of:

forming a fiber preform by co-extrusion or sequential extrusion of an inner core layer, an outer core layer, and a cladding layer, wherein the inner core layer possesses a smoothly varying or substantially uniform index of refraction, the outer core layer possesses a lower, smoothly varying, graded index of refraction, and the cladding layer possesses an uniform index of refraction, wherein the lowest refractive index of the inner core is higher than the highest refractive index of the graded outer core, and the lowest refractive index of the outer core is lower than the refractive index of the cladding layer; and curing the fiber preform to produce the fiber.

3. A method for the preparation of an optical fiber having an inner core with a smoothly varying or substantially uniform index of refraction; an outer core on the inner core, the outer core having a refractive index that is lower than the refractive index of the inner core and which decreases smoothly, monotonically and nonlinearly with increasing fiber radius; and a cladding layer on the outer core, the cladding layer having a substantially uniform refractive index which is greater than the refractive index of the outer core at the boundary of the outer core and the cladding layer; comprising the steps of:

forming an optical preform rod fiber consisting of an inner core layer, an outer core layer, and a cladding layer, wherein the inner core layer has a smoothly varying or substantially uniform index of refraction, the outer core layer has a lower, smoothly varying graded index of refraction, and the cladding layer has a uniform index of refraction, wherein the lowest refractive index of the inner core is higher than the highest refractive index of the graded outer core, and the refractive index of the cladding layer is greater than the refractive index of the outer core at the boundary of the outer core and the cladding layer;

heating the preform to a temperature required for drawing;

drawing the heated preform into an optical fiber of predetermined diameter; and cooling the optical fiber.

* * * * *

UNITED STATES PATENT AND TRADEMARK OFFICE
CERTIFICATE OF CORRECTION

PATENT NO. : 5,911,025
DATED : June 8, 1999
INVENTOR(S) : Garito et al.

It is certified that error appears in the above-identified patent and that said Letters Patent is hereby corrected as shown below:

Col. 5., line 56, please delete "is";
Col. 13, line 13, please delete "4" before "temperature";
Col. 17, line 23, Example (17) please delete
"$n^2(r)=n_0^2-(n_0^2-n_4^2)(r/R)^2$ for $r_1<r>r_2$" and insert therefor
--$n^2(r)=n_0^2-(n_0^2-n_4^2)(\frac{r}{R})^2$ for $r_1<r<r_2$"--
Col. 18, line 3, Example (19) please delete:

"$v = \sqrt{n\frac{2}{1} - n\frac{2}{4}} 2\pi \frac{a}{\lambda}$"  an insert therefor --$v = \sqrt{n_1^2 - n_4^2} \frac{2\pi a}{\lambda}$--

Signed and Sealed this

Twenty-ninth Day of May, 2001

Attest:

NICHOLAS P. GODICI

Attesting Officer     Acting Director of the United States Patent and Trademark Office